United States Patent
Tokuda et al.

(10) Patent No.: US 7,666,920 B2
(45) Date of Patent: Feb. 23, 2010

(54) RADIATION CURABLE RESIN COMPOSITION FOR LENS SHEET AND LENS SHEET

(75) Inventors: Hiroyuki Tokuda, Sakura (JP); Yasunari Kawashima, Chiba (JP); Yasuhiro Doi, Osaka (JP)

(73) Assignees: Dai Nippon Ink and Chemicals, Inc., Itabashi-Ku (JP); Dai Nippon Printing Co., Ltd., Shinjuku-Ku (JP)

( * ) Notice: Subject to any disclaimer, the term of this patent is extended or adjusted under 35 U.S.C. 154(b) by 561 days.

(21) Appl. No.: 10/565,574

(22) PCT Filed: Jul. 15, 2004

(86) PCT No.: PCT/JP2004/010124

§ 371 (c)(1), (2), (4) Date: Jan. 23, 2006

(87) PCT Pub. No.: WO2005/008299

PCT Pub. Date: Jan. 27, 2005

(65) Prior Publication Data

US 2006/0189706 A1    Aug. 24, 2006

(30) Foreign Application Priority Data

Jul. 22, 2003    (JP) .............................. 2003-199983

(51) Int. Cl.
*C08F 2/46*  (2006.01)
*C08F 2/50*  (2006.01)
*C08J 3/28*  (2006.01)
*B29D 11/00*  (2006.01)
*G02B 1/00*  (2006.01)
*G02B 1/04*  (2006.01)

(52) U.S. Cl. ........................ 522/100; 522/102; 522/103; 522/90; 522/92; 522/96; 522/150; 522/151; 522/152; 522/153; 522/154; 522/162; 522/166; 522/168; 522/170; 522/173; 522/174; 522/178; 522/181; 522/182; 359/742; 359/457; 359/443; 359/448; 428/424.4; 264/1.1; 264/1.32; 264/1.34; 264/1.36; 264/1.38

(58) Field of Classification Search ................... 522/90, 522/92, 96, 100, 101, 102, 103, 150, 151, 522/152, 153, 154, 162, 166, 168, 170, 173, 522/174, 178, 181, 182; 359/742, 457, 443, 359/448; 428/424.4; 264/1.1, 1.32, 1.34, 264/1.36, 1.38
See application file for complete search history.

(56) References Cited

U.S. PATENT DOCUMENTS

| | | | |
|---|---|---|---|
| 5,308,886 A | 5/1994 | Masuhara et al. | |
| 5,410,006 A * | 4/1995 | Tachibana et al. | ........ 526/292.6 |
| 5,714,218 A * | 2/1998 | Nishio et al. | ................ 428/64.1 |
| 5,903,399 A * | 5/1999 | Yamashita et al. | .......... 359/742 |
| 6,309,585 B1 * | 10/2001 | Zheng | ........................ 264/496 |
| 6,335,079 B1 | 1/2002 | Osawa et al. | |
| 6,809,889 B2 | 10/2004 | Tokuda et al. | |
| 2005/0148676 A1 * | 7/2005 | Doi et al. | ........................ 520/1 |

FOREIGN PATENT DOCUMENTS

| | | |
|---|---|---|
| JP | 04-004209 A1 | 1/1992 |
| JP | 11-189629 A1 | 7/1999 |
| JP | 11-240926 A1 | 9/1999 |
| JP | 2002-035654 A1 | 12/2002 |
| JP | 2003-131004 A1 | 5/2003 |
| JP | 2003-342338 A1 | 12/2003 |

* cited by examiner

*Primary Examiner*—Sanza L McClendon
(74) *Attorney, Agent, or Firm*—Burr & Brown

(57) ABSTRACT

The present invention relates to a radiation curable resin composition which comprises epoxy (meth)acrylate, a monofunctional (meth)acrylate, a bifunctional (meth)acrylate having a specific structure, and a bifunctional (meth)acrylate obtained from an aliphatic dihydric alcohol having an oxyalkylene structure and (meth)acrylic acid and further contains a thermoplastic resin, thereby causing satisfactory adhesion to plastic substrates, sufficient shape retention, and excellent shape recovery properties, and satisfaction in moldability including casting efficiency and shape reproducibility, as well as a high refractive index and appropriateness for use as a lens sheet.

11 Claims, 2 Drawing Sheets

RADIATION CURABLE RESIN COMPOSITION FOR LENS SHEET AND LENS SHEET

FIELD OF THE INVENTION

This invention relates to a radiation curable resin composition for lens sheet use which is capable of being used suitably for manufacturing a lens sheet, such as a Fresnel lens sheet or a lenticular lens sheet, having a structure in which a molded layer performing a lens function and made of a cured resin material is provided on a plastic substrate, and also to a lens sheet produced by curing the resin composition into a lens shape on a plastic substrate.

BACKGROUND OF THE INVENTION

An example conventionally known as a transmission type screen such as is used in projection TV sets has a structure using a combination of a Fresnel lens sheet for converting diffuse light from a light source such as a CRT into parallel beams to be sent to the viewers, and a lenticular lens sheet which performs the function of distributing light only within the range which the viewers watch, for effective use of a fixed amount of light.

A method proposed for forming and processing these lens sheets is the effective formation of a lens sheet in a short time by the irradiation of an energy ray to form a lens layer which has microstructure and is made of a radiation curable resin composition, on a plastic substrate. Since the radiation curable resin composition used for these lens sheets has the characteristics of a high elastic modulus and a high refractive index, the example of using an epoxy (meth)acrylate resin composite has been reported.

The requirements for a lens layer of microstructure made of such a radiation curable resin composition are excellent shape retention withstanding external forces locally applied during the manufacturing process and the like or a change in environment temperature, a high mechanical strength such that disadvantages such as fracture and chipping are not produced upon application of an impact or the process of cutting the sheet, a satisfactory degree of adhesion to the plastic substrate, a high refractive index, and the like.

An example known a radiation curable resin composition for meeting such requirements is a ultraviolet-curable resin composition for a transmission type screen which includes, in specific proportions as essential ingredients, a bisphenol-A type epoxy (meth)acrylate, a bifunctional reactive monomer, a monofunctional reactive monomer and a photoinitiator. This composition has the advantages of providing a cured material with a satisfactory degree of adhesion to a plastic substrate and a high refractive index (see Patent Document 1, for example).

Another known example is an ionization-radiation curable resin composition for a Fresnel lens including a bisphenol-A type epoxy (meth)acrylate, a monofunctional (meth)acrylate such as phenoxy ethyl acrylate, a bifunctional (meth)acrylate such as bisphenol-A tetrapropoxydiacrylate, and a polymer such as an acrylic resin or a polyurethane resin. This composition has the advantages of providing a cured material with a high refractive index, outstanding abrasion resistance and outstanding adhesion to a substrate (see Patent Document 2, for example).

Patent Document 1: JP-A-H5-287040 (pp. 3-6)

Patent Document 2: JP-A-H 11-240926 (pp. 3-4) (U.S. Pat. No. 6,335,079B1)

However, a cured material made of an ultraviolet-curable resin composition for a transmission type screen, which is described in Patent Document 1, has the disadvantages of a propensity for occurrence of indentation creep even after the crosslinking reaction and insufficient shape retention, because a high proportion of a monofunctional reactive monomer from 40 mass % to 70 mass % causes a loosely crosslinked structure resulting from the reaction between a bisphenol-A type epoxy (meth)acrylate and a bifunctional reactive monomer, resulting in a low crosslink density.

Further, a cured material made of ionization-radiation curable resin composition for a Fresnel lens, which is described in Patent Document 2, can exhibit shape recovery properties and shape retention to a certain degree by means of control of a proportion of the content of a polymer component, e.g. a low glass transition temperature polymer such as a polyester polyurethane resin (glass transition temperature Tg: −20° C.), but shape recovery properties and shape retention are insufficient. For this reason, it is difficult to provide the shape recovery properties and the shape retention while concurrently maintaining the moldability such as the casting efficiency of infusing a radiation curable resin composition between the mother mold and the plastic substrate and the shape reproducibility provided by the spread of the resin into the intricate details of the mother mold.

To solve the problems, it is an object of the present invention to provide a radiation curable resin composition for lens sheets use which is outstanding in adhesion to a plastic substrate, shape recovery properties, mechanical strength and moldability, and further shows a high refractive index, and to provide a lens sheet using the resin composition.

SUMMARY OF THE INVENTION

As a result of energetically redoubling research of the inventors into a solution of the above problems, the inventors have arrived at this invention by establishing the fact that a radiation curable resin composition, which has satisfactory adhesion to a plastic substrate, favorable shape retention, outstanding shape recovery properties, and adequate moldability such as casting efficiency and shape reproducibility, and moreover shows a high refractive index, and which thus is suitable for use as a radiation curable resin composition for lens sheets, can be made by use of: an epoxy (meth)acrylate (a); a monofunctional (meth)acrylate (c); a bifunctional (meth)acrylate (b1) expressed by the general formula (1) described below; a bifunctional (meth)acrylate (b2) expressed by the general formula (2) described below; and a bifunctional (meth)acrylate (b3) obtained from (meth)acrylic acid and an aliphatic dihydric alcohol having an oxyalkylene structure, and by adding a thermoplastic resin (d) thereto.

Specifically, the present invention provides a radiation curable resin composition for lens sheet use which is characterized by comprising:

an epoxy (meth)acrylate (a);

a bifunctional (meth)acrylate (b1) expressed by the general formula (1) described below,

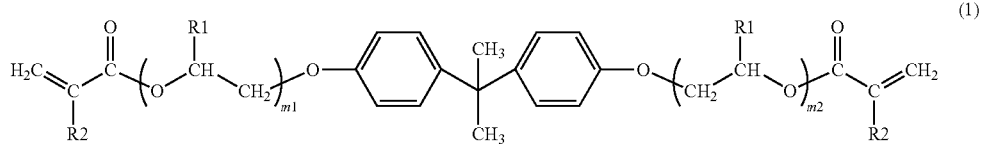

(1)

(wherein, R1, R2 denote either hydrogen atoms or a methyl group, and a mean value of m1+m2 is 1 to 5);

a bifunctional (meth)acrylate (b2) expressed by the general formula (2) described below,

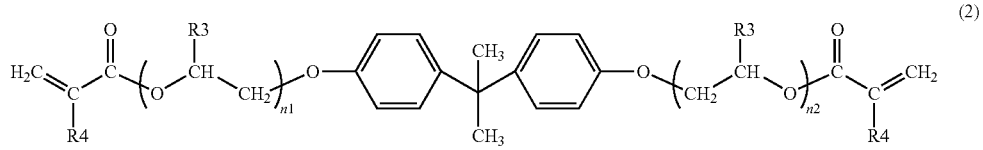

(wherein, R3, R4 denote either hydrogen atoms or a methyl group, and a mean value of n1+n2 is 8 to 20);

a bifunctional (meth)acrylate (b3) obtained from (meth)acrylic acid and an aliphatic dihydric alcohol having an oxyalkylene structure;

a monofunctional (meth)acrylate (c); and a thermoplastic resin (d).

Further, the present invention provides a lens sheet characterized in that a lens-shaped resin layer resulting from curing the radiation curable resin composition for lens sheet application is provided on a plastic substrate.

With the radiation curable resin composition for lens sheet application according to the present invention, it is possible to provide a lens sheet having outstanding properties of adhesion to a plastic substrate, shape recovery, the mechanical strength and moldability, and particularly a high refractive index.

Accordingly, when this radiation curable resin composition is used to manufacture a transmission type screen, the transmission type screen has the advantages of improving resistance properties to recovery from the contact pressure on a lenticular lens and the pressure applied in the assembly process performed after the television unit setting process, to facilitate handling in the screen setting process, that is, a design relating to workability and assembly. Further, a high refractive index allows the design of a shorter focus lens.

EXPLANATION OF CODES

Figure 1:
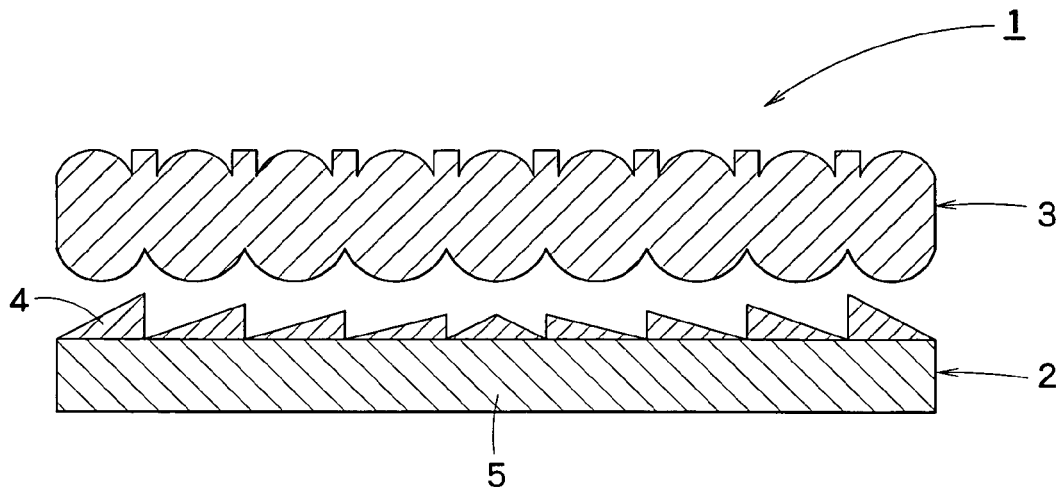
FIG. 1 is a sectional view illustrating an example of a transmission-type screen using a Fresnel lens sheet.

1: TRANSMISSION-TYPE SCREEN LENS
2: FRESNEL LENS SHEET
3: LENTICULAR LENS SHEET
4: RESIN LAYER OF FRESNEL LENS SHAPE
5: PLASTIC SUBSTRATE
POINT A: POINT OF LOAD=ZERO
POINT B: POINT AT WHICH LOAD IS INCREASED TO SET VALUE
POINT C: POINT AT WHICH SET LOAD HAS BEEN MAINTAINED FOR PREDETERMINED TIME PERIOD
POINT D: POINT AT WHICH LOAD IS DECREASED TO MINIMUM
POINT E: POINT AT WHICH MINIMUM LOAD HAS BEEN MAINTAINED FOR PREDETERMINED TIME PERIOD
6: BALL INDENTOR
P: INTERVAL BETWEEN CONCAVE PORTIONS OF ADJACENT LENS SURFACES

DETAILED DESCRIPTION OF THE INVENTION

A preferred embodiment according to the present invention will be described below in detail.

Epoxy (meth)acrylate (a) used in the present invention results from the (meth)acrylation of epoxy groups in various epoxy resins. An example of the epoxy (meth)acrylate is obtained by the reaction between an epoxy resin having two or more epoxy groups in one molecule and (meth)acrylic acid in a proportion of 1 equivalent of an epoxy group of an epoxy resin to 0.7 to 1.5 equivalent of (meth)acrylic acid, preferably, 0.9 to 1.1 equivalent. An example of the epoxy resins used here is an epoxy resin with an epoxy equivalent of 180 g/eq to 2,000 g/eq, preferably, 200 g/eq to 1,100 g/eq. An example of the epoxy (meth)acrylate obtained from these epoxy resins has a molecular weight of 500 to 4,200, preferably, of 550 to 2,400.

Further, as the specific examples of the epoxy (meth)acrylate used are (meth)acrylate of an aliphatic epoxy resin, (meth)acrylate of a bisphenol-type epoxy resin, (meth)acrylate of a hydrogenated bisphenol-type epoxy resin, (meth)acrylate of a novolac-type epoxy resin, (meth)acrylate of an epoxy resin having a naphthalene structure, and the like and any mixture of them.

Note that in the present invention (meth)acrylate means one or both of acrylate and methacrylate. Similarly, (meth)acrylic acid, (meth)acryloyl mean one or both of acrylic acid and methacrylic acid, and (meth)acryloyl means one or both of acryloyl and methacryloyl.

An epoxy (meth)acrylate having a cyclic structure and two or more (meth)acryloyl groups in one molecule, of the above examples of the epoxy (meth)acrylate (a) is preferable for achievement of excellent mechanical strength and therefore an increase in refractive index. As the specific examples of this epoxy (meth)acrylate are (meth)acrylate of a bisphenol-A type epoxy resin, (meth)acrylate of a bisphenol-F type epoxy resin, (meth)acrylate of a bisphenol-A type epoxy resin partially substituted by halogen, (meth)acrylate of a bisphenol-F type epoxy resin partially substituted halogen, (meth)acrylate of hydrogenated bisphenol-A type epoxy resin, any mixture of them, and the like. Of these, the (meth)acrylate of a bisphenol-A type epoxy resin is particularly preferable.

As the examples of the bifunctional (meth)acrylate (b1) expressed by the general formula (1), used in the present invention, are di(meth)acrylate of ethylene oxide modified bisphenol-A with an average number of added moles of ethylene oxide ranging from 1 to 5 [the mean value of m1+m2 in the general formula (1)], di(meth)acrylate of propylene oxide modified bisphenol-A with an average number of added moles of propylene oxide ranging from 1 to 5, di(meth)acrylate of ethylene-oxide propylene-oxide modified bisphenol-A with an average number of added moles of both ethylene oxide and propylene oxide ranging from 1 to 5, and the like.

Preferable examples of the above examples of the bifunctional (meth)acrylate compound (b1) are di(meth)acrylate of ethylene oxide modified bisphenol-A with an average number of added moles of ethylene oxide ranging from 3 to 5 and di(meth)acrylate of propylene oxide modified bisphenol-A with an average number of added moles of propylene oxide ranging from 3 to 5, because they can achieve excellent mechanical strength, and a particularly preferable example is di(meth)acrylate of ethylene oxide modified bisphenol-A with an average number of added moles of ethylene oxide ranging from 3 to 4.

As the examples of the marketed products of the bifunctional (meth)acrylate compound (b1) used are ARONIX M-210, ARONIX M-211B (which are produced by Toagosei Corporation), LIGHT-ACRYLATE BP-4EA, LIGHT-ACRYLATE BP-4PA, LIGHT-ESTER BP-2EM [which are produced by KYOEISHA CHEMICAL Corporation], NK ESTER A-BPE-4, NK ESTER BPE-100, NK ESTER BPE-200 [which are produced by Shin-nakamura Chemical Corporation], KAYARAD R-55 [produced by Nippon Kayaku Corporation], BEAM SET 750[produced by Arakawa Chemicals Industries], SR-348, SR-349, SR601 [which are produced by Kayaku Sartomer Company], New Frontier BPE-4, New Frontier BPE-4 [which are produced by Dai-ichi Kogyo Seiyaku Corporation], Viscoat#700 [produced by Osaka organic chemistry industry Corporation], Photomer 4028 [produced by San Nopco Limited], Ebecryl 150, Ebecryl 1150, BPA(E03)DMA [which are produced by Daicel UCB], BLEMMER-ADBE-200, BLEMMER-PDBE-200, BLEMMER ADBP series, BLEMMER PDBP series, BLEMMER ADBEP series, BLEMMER PDBEP series [which are produced by NOF CORPORATION], and the like.

As the examples of the bifunctional (meth)acrylate (b2) expressed by the general formula (2), used in the present invention, are di(meth)acrylate of ethylene oxide modified bisphenol-A with an average number of added moles of ethylene oxide ranging from 8 to 20 [the mean value of n1+n2 in the general formula (2)], di(meth)acrylate of propylene oxide modified bisphenol-A with an average number of added moles of propylene oxide ranging from 8 to 20, di(meth)acrylate of ethylene-oxide propylene-oxide modified bisphenol-A with an average number of added moles of both ethylene oxide and propylene oxide ranging from 8 to 20, and the like.

Preferable examples of the above examples of the bifunctional (meth)acrylate compound (b2) are Di(meth)acrylate of ethylene oxide modified bisphenol-A with an average number of added moles of ethylene oxide ranging from 8 to 16 and di(meth)acrylate of propylene oxide modified bisphenol-A with an average number of added moles of propylene oxide ranging from 8 to 16, because they can achieve favorite shape recovery properties. A particularly preferable example is di(meth)acrylate of ethylene oxide modified bisphenol-A with an average number of added moles of ethylene oxide ranging from 9 to 12.

As the examples of the marketed products of the bifunctional (meth)acrylate compound (b2) are SR-602, SR-480 [which are produced by Kayaku Sartomer Company], New Frontier BPE-10, New Frontier BPE-20, BPEM-10 [which are produced by Dai-ichi Kogyo Seiyaku Corporation], Photomer 4025 [produced by San Nopco Limited], NK ESTER BPE-500 [produced by Shin-nakamura Chemical Corporation], FANCRYL FA-321M [which are produced by Hitachi Chemical Corporation], BLEMMER-PDBE-400, BLEMMER 43PDBP-800B [which are produced by NOF CORPORATION], and the like.

As examples of the bifunctional (meth)acrylate (b3) obtained from (meth)acrylic acid and an aliphatic dihydric alcohol and having an oxyalkylene structure [—(O—R')$_k$—, wherein R' is an alkylene group and k is an integer of one or more] used in the present invention are compounds to which two molecules of (meth)acrylic acid are linked through ester bond, including: ethylene glycol di(meth)acrylate; propylene glycol di(meth)acrylate; polyethylene glycol di(meth)acrylate, such as diethylene glycol di(meth)acrylate, triethylene glycol di(meth)acrylate, tetraethylene glycol di(meth)acrylate, heptaethylene glycol di(meth)acrylate; polypropylene glycol di(meth)acrylate such as dipropylene glycol di(meth)acrylate, tripropylene glycol di(meth)acrylate, tetrapropylene glycol di(meth)acrylate, and heptapropylene glycol di(meth)acrylate; di(meth)acrylate, such as 1,3-butylene glycol di(meth)acrylate, 1,4-butylene glycol di(meth)acrylate, 1,6-hexamethylene glycol di(meth)acrylate, 1,9-nonanediol di(meth)acrylate; neopentylglycol di(meth)acrylate, hydroxypivalate neopentylglycol di(meth)acrylate, di(meth)acrylate including caprolactone added to hydroxypivalic acid neopentyl glycol, neopentylglycol adipate di(meth)acrylate; and the like.

A preferable example of the above examples of the bifunctional (meth)acrylate (b3) is bifunctional (meth)acrylate (b31) obtained from (meth)acrylic acid and an aliphatic dihydric alcohol having an oxypropylene structure as the oxyalkylene structure because a cured material obtained will have a satisfactory degree of adhesion to a plastic substrate.

As the examples of the bifunctional (meth)acrylate (b31) are propylene glycol di(meth)acrylate; di(meth)acrylate of polypropylene glycol such as dipropylene glycol di(meth)acrylate, tripropylene glycol di(meth)acrylate, tetrapropylene glycol di(meth)acrylate and heptapropylene glycol di(meth)acrylate; and the like.

A desirable mass ratio (b1)/(b2) of the bifunctional (meth)acrylate (b1) and the bifunctional (meth)acrylate (b2) ranges from 20/80 to 80/20, preferably, 30/70 to 70/30, in order to obtain a cured material having a desirable combination of the adhesion and the mechanical strength, Further, a desirable mass ratio of (b3)/[(b1)+(b2)] of the bifunctional (meth)acrylate (b3) to the total of the bifunctional (meth)acrylate (b1) and the bifunctional (meth)acrylate (b2) ranges from 15/85 to 70/30, preferably, 25/75 to 60/40, in order to obtain a cured material having satisfactory degrees of adhesion and mechanical strength.

In the present invention, another bifunctional (meth)acrylate (b4) [except for epoxy (meth)acrylate (a) which is bifunctional epoxy (meth)acrylate] can be used in addition to the bifunctional (meth)acrylates (b1), (b2) and (b3), as required. Such bifunctional (meth)acrylate (b4) is used in combination as necessary to serve the purpose of fine-adjusting the viscosity and the refractive index, for example. Among the examples of the bifunctional (meth)acrylate (b4) used are: a compound in which two molecules of (meth)acrylic acid is attached through ester bond to a compound having two hydroxyl groups, such as ethylene oxide adduct of halogenated bisphenol-A, propylene oxide adduct of halogenated bisphenol-A, ethylene oxide adduct of bisphenol-F, propylene oxide adduct of bisphenol-F, ethylene oxide adduct of halogenated bisphenol-F, propylene oxide adduct of halogenated bisphenol-F, ethylene oxide adduct of bisphenol-S, propylene oxide adduct of bisphenol-S, ethylene oxide adduct of halogenated bisphenol-S, propylene oxide adduct of halogenated bisphenol-S, tricyclo decane dimethylol; and the like.

Sulfur-containing compound such as bis[4-(meth)acryloyloxyphenyl]-sulfide, bis[4-(meth)acryloyloxyethoxyphenyl]-sulfide, bis[4-(meth)acryloyloxypentaethoxyphenyl]-sulfide, bis[4-(meth)acryloyloxyethoxy-3-phenylphenyl]-sulfide, bis[4-(meth)acryloyloxyethoxy-3,5-dimethylphenyl]-sulfide, and bis(4-(meth)acryloyloxyethoxyphenyl)sulfone; di[(meth)acryloyloxyethoxy]phosphate; and the like.

A preferable proportion of bifunctional (meth)acrylate (b4) with respect to 100 parts by mass of the total amount of the bifunctional (meth)acrylates (b1), (b2), (b3) and (b4) is typically 30 or less parts by mass, preferably 1 to 20 parts by mass.

As the examples of the monofunctional (meth)acrylate (c) used in the present invention are monofunctional (meth)acrylate having a cyclic structure, monofunctional (meth)acrylate with an alkyl group having carbon numbers ranging from 1 to 22, monofunctional (meth)acrylate having a hydroxyalkyl group, lactone modified hydroxyethyl (meth)acrylate, (meth)acrylate having a polyalkylene glycol group, phosphoethyl (meth)acrylate, N,N-dialkylaminoalkyl (meth)acrylate, and the like. A preferable example of the above examples is the monofunctional (meth)acrylate (c1) having a cyclic structure for achievement of high refractive index as required without a decrease in elastic modulus.

As the examples of the monofunctional (meth)acrylate (c1) having a cyclic structure are: benzoyloxyethyl (meth)acrylate, benzyl (meth)acrylate, phenylethyl (meth)acrylate, phenoxyethyl (meth)acrylate, phenoxy diethylene glycol (meth)acrylate, and 2-hydroxy-3-phenoxypropyl (meth)acrylate; 2-phenyl-2-(4-(meth)acryloyloxyphenyl)propane, expressed by the following general formula (3),

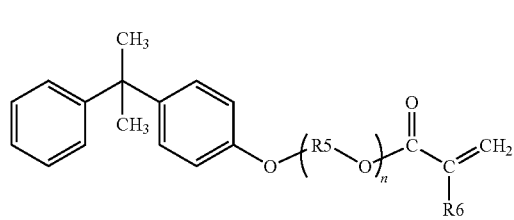

(3)

(wherein R5 is a hydrocarbon group having 1 to 5 carbon atoms, R6 is either a hydrogen atom or a methyl group, and n is a mean value of zero to 3),
2-phenyl-2-(4-(meth)acryloyloxyethoxyphenyl)propane,
2-phenyl-2-(4-(meth)acryloyloxypropoxyphenyl)propane, and the like;
monofunctional (meth)acrylate having an aromatic ring, such as chlorophenyl (meth)acrylate, bromophenyl (meth)acrylate, chlorobenzyl (meth)acrylate, bromobenzyl (meth)acrylate, chlorophenylethyl (meth)acrylate, bromophenylethyl (meth)acrylate, chlorophenoxyethyl (meth)acrylate, bromophenoxyethyl (meth)acrylate, 2,4,6-trichlorophenyl (meth)acrylate, 2,4,6-tribromophenyl (meth)acrylate, 2,4,6-trichlorobenzyl (meth)acrylate, 2,4,6-tribromobenzyl (meth)acrylate, 2,4,6-trichlorophenoxyethyl (meth)acrylate, 2,4,6-tribromophenoxyethyl (meth)acrylate, o-phenylphenol(poly)ethoxy (meth)acrylate and p-phenylphenol(poly)ethoxy(meth)acrylate;

(Meth)acrylates having an cyclo aliphatic structure or a hetrocyclic structure, such as cyclohexyl (meth)acrylate, isobornyl (meth)acrylate, dicyclopentyl (meth)acrylate, dicyclopentenyloxyethyl (meth)acrylate, tetrahydrofurfuryl (meth)acrylate and glycidyl cyclocarbonate (meth)acrylate; and the like.

Note that, a part of the monofunctional (meth)acrylate (c), for example 1 mass % to 40 mass % of the monofunctional (meth)acrylate (c), can be substituted by a vinyl compound having an aromatic ring structure or heterocycle structure. Among the examples of the vinyl compound having the aromatic ring structure are styrene, α-methylstyrene, and the like. As the examples of the vinyl compound having the heterocycle structure are N-vinylpyrrolidone, N-vinylcaprolactam, acryloyl morpholine, and the like.

The monofunctional (meth)acrylate having an aromatic ring of the above examples is desirable because the mechanical strength and high refractive index are not impaired.

As the examples of the thermoplastic resin used in the present invention are: an acrylic-type resin such as a polymethyl methacrylate resin and a methyl methacrylate copolymer; a polyurethane-type resin; a polyester-type resin; a styrene-type resin such as polystyrene and a styrene-methyl methacrylate copolymer; a polybutadiene-type resin such as polybutadiene and a butadiene-acrylonitrile copolymer; a thermoplastic epoxy resin such as a phenoxy resin; and the like. The polyurethane-type resin of the above examples is preferable because it can achieve satisfactory shape recovery properties and exhibits outstanding compatibility with the epoxy (meth)acrylate (a), the bifunctional (meth)acrylates (b1), (b2), (b3) and the like.

Further, a preferred type of the above-described thermoplastic resin (d) has a glass transition temperature (Tg) of 20° C. or less, and a thermoplastic resin having a Tg in the range of from −70° C. to 0° C. is particularly preferred because it functions to enhance the effect of improving the shape recovery properties. A polyurethane-type resin among these thermoplastic resins having a Tg in the range of from −70° C. to 0° C. is especially preferred, and a polyurethane-type resin having a Tg in the range of from −70° C. to −43° C. is particularly preferred.

For reference, when an acrylic-type resin is used as the plastic substrate and a polyurethane-type resin is used as the thermoplastic resin (d), an acrylic type resin can be used in combination with the polyurethane-type resin as the thermoplastic resin (d) to improve adhesion to the acrylic-type substrate. When the acrylic-type resin is used in combination with polyurethane-type resin, the percentage of the urethane-type resin content is preferably 60 mass % or more.

Note that, in the present invention, values of the glass transition temperature (Tg) of the thermoplastic resin (d) are defined as values obtained from data concerning measurements made by use of a differential scanning calorimeter (DSC) on condition that a rate of temperature rise is 10° C./min. and measurement temperature ranges from −100° C. to 150° C.

In the radiation curable resin composition for lens sheet use according to the present invention, for achievement of satisfactory adhesion to the plastic substrate, favorable shape recovery properties, a high mechanical strength and a high refractive index, 100 parts by mass of the total amount of the epoxy (meth)acrylate (a), bifunctional (meth)acrylate (b1), bifunctional (meth)acrylate (b2), bifunctional (meth)acrylate (b3), monofunctional (meth)acrylate (c), and thermoplastic resin (d) comprises 20 to 70 parts by mass of the epoxy (meth)acrylate (a), 5 to 60 parts by mass of the total amount of the bifunctional (meth)acrylates (b1), (b2) and (b3), 5 to 40 parts by mass of the monofunctional (meth)acrylate (c), and 0.5 to 10 parts by mass of the thermoplastic resin (d). Further, particularly preferably, 30 to 50 parts by mass of the epoxy (meth)acrylate (a), 25 to 45 parts by mass of the total amount of the bifunctional (meth)acrylates (b1), (b2) and (b3), 15 to 35 parts by mass of the monofunctional (meth)acrylate (c), and 1 to 10 parts by mass of the thermoplastic resin (d). For the sake of reference, when the bifunctional (meth)acrylate (b4) is used additionally, 100 parts by mass of the total amount of (a), (b1), (b2), (b3), (b4), (c) and (d) includes desirably 5 to 60 parts by mass of the total amount of (b1), (b2), (b3) and (b4), preferably, 25 to 45 parts by mass.

The essential ingredients of radiation curable resin composition for lens sheet use according to the present invention are the six ingredients of the aforementioned (a), (b1), (b2), (b3), (c) and (d). However, addition of a multifunctional, trifunctional or more than trifunctional, (meth)acrylate (e) is desirable because the crosslink density is increased and the degrees of shape retention and mechanical strength of a resulting cured material are increased.

As the examples of the multifunctional (meth)acrylate (e) used are multifunctional (meth)acrylate such as trimethylolpropane tri(meth)acrylate, pentaerythritol tri(meth)acrylate, glycerin tri(meth)acrylate, tri(acryloyloxyethyl)isocyanurate, pentaerythritol tetra(meth)acrylate, dipentaerythritol hexa(meth)acrylate, dipentaerythritol penta(meth)acrylate, tri[(meth)acryloyloxyethoxy]phosphate.

Various types of multifunctional (meth)acrylate can be used as the multifunctional (meth)acrylate (e) as long as it is trifunctional or more than trifunctional (meth)acrylate, but the use of (meth)acrylate (e1) of aliphatic polyhydric alcohol having a propylene oxide structure of them is desirable because it becomes possible to increase the crosslink density without impairment of adhesion to the plastic substrate.

As the examples of the (meth)acrylate (e1) of aliphatic polyhydric alcohol having a propylene oxide structure is a compound having ester linkage of (meth)acrylic acid created after 1 mol to 20 mol propylene oxide is added to trifunctional or more than trifunctional polyhydric alcohol such as trimethylolpropane, ditrimethylolpropane, pentaerythritol, dipentaerythritol, tetramethylolmethane or the like. Of them, a compound having ester linkage of (meth)acrylic acid created after 3 mol to 9 mol propylene oxide is added to aliphatic polyhydric alcohol is preferable.

When the radiation curable resin composition for lens sheet use according to the present invention includes additionally the multifunctional (meth)acrylate (e), for achievement of enhancement in the crosslink density, satisfactory adhesion to the plastic substrate, favorable shape recovery properties of the cured resin layer, a high mechanical strength and a high refractive index, 100 parts by mass of the total amount of the epoxy (meth)acrylate (a), bifunctional (meth)acrylate (b1), bifunctional (meth)acrylate (b2), bifunctional (meth)acrylate (b3), monofunctional (meth)acrylate (c), thermoplastic resin (d) and the multifunctional (meth)acrylate (e) comprises 20 to 70 parts by mass of the epoxy (meth)acrylate (a), 5 to 60 parts by mass of the total amount of the bifunctional (meth)acrylates (b1), (b2) and (b3), 5 to 40 parts by mass of the monofunctional (meth)acrylate (c), 0.5 to 10 parts by mass of the thermoplastic resin (d), and 1 to 10 parts by mass of the multifunctional (meth)acrylate (e). Further, particularly preferably, 30 to 50 parts by mass of the epoxy (meth)acrylate (a), 25 to 45 parts by mass of the total amount of the bifunctional (meth)acrylates (b1), (b2) and (b3), 15 to 35 parts by mass of the monofunctional (meth)acrylate (c), 1 to 10 parts by mass of the thermoplastic resin (d), and 1 to 8 parts by mass of the multifunctional (meth)acrylate (e). For the sake of reference, when the bifunctional (meth)acrylate (b4) is used additionally, 100 parts by mass of the total amount of (a), (b1), (b2), (b3), (b4), (c), (d) and (e) includes desirably 5 to 60 parts by mass of the total amount of (b1), (b2), (b3) and (b4), preferably, 25 to 45 parts by mass.

A desirable refractive index of the cured radiation curable resin composition for lens sheet use according to the present invention composed of the foregoing components is 1.55 or more. Thereby, when a lens sheet is manufactured, even if the depth of the lens shape is decreased to make mold release characteristics from the mother mold, the lens sheet obtained exhibits excellent optical performance.

For the purpose of uniform application to a mother mold and further of achievement of reproduction of the mold shape having microstructure, the viscosity of the radiation curable resin composition for lens sheet use according to the present invention (the viscosity measured at 25° C. by an E-type rotational viscometer) ranges desirably from 1,000 mPa·s to 30,000 mPa·s at 25° C., particularly preferably, from 3,000 mPa·s to 23,000 mPa·s. If the viscosity of the composition is out of the above range, the resin composition can be used by means of a method of controlling the temperature of the resin composition to adjust the viscosity.

When a lens sheet with fine patterning has been molded and thereafter, is removed from the mother mold, external forces are often applied to the lens-sheet shape to deform it. In the radiation curable resin composition for lens sheet use according to the present invention, for easy recovery from the deformation, the temperature [T(max)] representing the maximum value of the mechanical loss tangent obtained through dynamic viscoelasticity measurement made at a frequency 1 Hz on the cured material which is cured by an radiation is desirably at 50° C. or less, particularly preferably, within a range from 30° C. to 50° C.

For the sake of reference, since dynamic viscoelasticity measurement is typically susceptible to the film thickness of a sample film, the values in the dynamic viscoelasticity measurement in the present invention are defined as values obtained from data derived from the measurement in a temperature range from −30° C. to 120° C. out of the data on the results of measurement which is made by use of a solid viscoelasticity measuring apparatus employing a distortion control method (e.g. RSA-2 produced by Rheometrics Corporation) on condition that a film used has a film thickness of 200±25 μm and a size of 6 mm×35 mm, a frequency is 1 Hz, a load distortion is 0.05%, a rate of temperature rise is 3° C./min., and a measurement temperature is −50° C. to 150° C.

The radiation curable resin composition for lens sheet use according to the present invention is cured by application of the radiation. The radiation means a ray having the energy quantum that allows polymerization, crosslinking of molecules of an electromagnetic wave or a charged particle ray. Examples of such a ray include the electromagnetic wave such as visible light, ultraviolet light and X rays and the charged particle ray such as electron beam. The practically most-used energy ray of the above examples is visible light, ultraviolet light or electron beam.

In the ultraviolet light, a ultra-high pressure mercury lamp, high-pressure mercury lamp, low-pressure mercury lamp, carbon arc, blacklight lamp, metal halide lamp and the like can be used for the light source.

When the radiation curable resin composition for lens sheet use according to the present invention is cured by the visible light or ultraviolet light, the resin composition includes photo(polymerization) initiator dissociating to produce radical by the application of ultraviolet light or visible light.

Various types of photoinitiator that dissociates by the irradiation to produce radical can be used. As the examples of the photo(polymerization) initiator are benzophenones, such as benzophenone, 3,3'-dimethyl-4-methoxybenzophenone, 4,4'-bisdimethylaminobenzophenone, 4,4'-bisdiethylaminobenzophenone, 4,4'-dichlorobenzophenone, Michler's ketone and 3,3',4,4'-tetra(t-butylperoxycarbonyl)benzophenone; xanthones and thioxanthones, such as xanthone, thioxanthone, 2-methylthioxanthone, 2-chlorothioxanthone and 2,4-diethylthioxanthone; acloin ethers, such as benzoin, benzoin methyl ether, benzoin ethyl ether and benzoin isopropyl ether; α-diketones, such as benzyl and diacetyl; sulfides, such as tetramethylthiuram disulfide and p-tolyl disulfide; benzoic acids such as 4-dimethylaminobenzoic acid and ethyl 4-dimethylaminobenzoate;

And also, 3,3'-carbonyl-bis(7-diethylamino)coumarin, 1-hydroxycyclohexyl phenyl ketone, 2,2'-dimethoxy-1,2-diphenylethan-1-one, 2-methy-1-[4-(methylthio)phenyl]-2-morpholinopropan-1-one, 2-benzyl-2-dimethylamino-1-(4-morpholinophenyl)-butan-1-one, 2-hydroxy-2-methyl-1-phenylpropan-1-one, 2,4,6-trimethylbenzoyldiphenylphosphine oxide, bis(2,4,6-trimethylbenzoyl)phenylphosphine oxide, 1-[4-(2-hydroxyethoxy)phenyl]-2-hydroxy-2-methyl-1-propan-1-one, 1-(4-isopropylphenyl)-2-hydroxy-2-methylpropan-1-one, 1-(4-dodecylphenyl)-2-hydroxy-2-methylpropan-1-one, 4-benzoyl-4'-methyldimethyl sulfide, 2,2'-diethoxyacetophenone, benzyl dimethyl ketal, benzyl-β-methoxyethylacetal, methyl o-benzoylbenzoate, bis(4-dimethylaminophenyl)ketone, p-dimethylaminoacetophenone, α,α-dichloro-4-phenoxyacetophenone, pentyl-4-dimethylamino benzoate, 2-(o-chlorophenyl)-4,5-diphenylimidazolyl dimer, 2,4-bis-trichloromethyl-6-[di-(ethoxycarbonylmethyl)amino]phenyl-S-triazine, 2,4-bis-trichloromethyl-6-(4-ethoxy)phenyl-S-triazine, 2,4-bis-trichloromethyl-6-(3-bromo-4-ethoxy)phenyl-S-triazineanthraquinone, 2-t-butylanthraquinone, 2-amylanthraquinone, β-chloroanthraquinone and the like.

As the examples of the marketed products of the photo (polymerization) initiator are Irgacure-127, -184, -149, -261, -369, -500, -651, -754, -784, -819, -907, -1116, -1300, -1664, -1700, -1800, -1850, -2959, -4043, Darocur-1173 (which are produced by Ciba Specialty Chemicals Corporation), Lucirin TPO (produced by BASF Corporation), KAYACURE-DETX, KAYACURE-MBP, KAYACURE-DMBI, KAYACURE-EPA, KAYACURE-OA (which are produced by Nippon Kayaku Corporation), VICURE-10, VICURE-55 (which are produced by STAUFFER Co. LTD), TRIGONALP1 (produced by AKZO Co. LTD), SANDORY 1000 (produced by SANDOZ Co. LTD), DEAP (produced by APJOHN Co. LTD), QUANTACURE-PDO, QUANTACURE-ITX, QUANTACURE-EPD (produced by WARDBLEKINSOP Co. LTD), and the like.

Further, in the radiation curable resin composition for lens sheet use according to the present invention, various types of photosensitizer can be used in combination with the photopolymerization initiator. For example, amines, ureas, sulfur-containing compounds, phosphorus-containing compound, chlorine-containing compounds or nitrites, or alternatively the other nitrogen compounds can be used as a photosensitizer.

Specifically, for achievement of a high degree of curable properties, particularly preferable examples are one or a mixture of two or more selected from the group consisting of:
1-hydroxycyclohexyl phenyl ketone,
2-hydroxy-2-methyl-1-phenylpropan-1-one,
1-[4-(2-hydroxyethoxy)phenyl]-2-hydroxy-2-methyl-1-propan-1-one,
thioxanthone and thioxanthone derivative,
2,2'-dimethoxy-1,2-diphenylethan-1-one,
2,4,6-trimethylbenzoyidiphenylphosphine oxide,
bis(2,4,6-trimethylbenzoyl)phenylphosphine oxide,
2-methyl-1-[4-(methylthio)phenyl]-2-morpholino-1-propanone and
2-benzyl-2-dimethylamino-1-(4-morpholinophenyl)-butan-1-one.

The photosensitizer can be used either alone or in combination of two kinds or more. The amount of the photosensitizer used is not particularly limited, but preferably ranges from 0.05 to 20 parts by mass, more preferably ranges from 0.1 to 10 parts by mass, with respect to 100 parts by mass of the radiation curable resin composition for lens sheet use according to the present invention including the photosensitizer, for the purpose of maintaining satisfactory sensibility and preventing crystal precipitation, deterioration in physical properties of coating and the like.

Further, when the radiation curable resin composition for lens sheet use according to the present invention is used to manufacture a lens sheet according to the present invention, the energy ray such as ultraviolet light is often irradiate through a transparent substrate surface serving as a base. Therefore, a preferable photo(polymerization) initiator has the capability of absorbing light in the long-wavelength region. For example, a photo(polymerization) initiator making use of the photoinitiation capability in the wavelength range from 360 nm to 450 nm is desirably used. A photo (polymerization) initiator having a high degree of absorption properties more than 450 nm has less stability. For this reason, the lens sheet is required to be manufactured in the environment where light is completely shielded, and therefore the handling is difficult. Note that when electron beam are used, these photo(polymerization) initiator and photosensitizer are unnecessary.

When the resin composition is cured by use of electron beam, any apparatus equipped with a radiation source of various types of an electron accelerator, such as a Cockcroft Walton type, a Van de Graaff type, resonance transformer type insulating core transformer type, linear type, dynamitron type and radiofrequency type electron accelerator, which radiates electrons having energy of from 100 keV to 1,000 keV, preferably, from 100 keV to 300 keV. A preferable radiation dose typically is approximately from 0.5 Mrad to 30 Mrad.

In the radiation curable resin composition for lens sheet use according to the present invention, an ultraviolet absorber can be added as necessary in the cases when light resistance is required of the cured resin molded layer formed on the substrate, and the like. Further, when property modification of coating, coating adequacy, properties of removing from the mother mold are improved, it is possible to add a silicone additive, fluorine additive, anti-oxidant, rheology control agent, defoamer, mold release agent, silane coupling agent, antistatic additive, anti-fog additive, coloring material or the like.

As the example of the silicone additive used is polyorganosiloxanes having a alkyl group or phenyl group such as dimethylpolysiloxane, methylphenylpolysiloxane, cyclic dimethylpolysiloxane, methylhydrogenpolysiloxane, a polyether modified dimethylpolysiloxane copolymer, a polyester modified dimethylpolysiloxane copolymer, a fluorine modified dimethylpolysiloxane copolymer, and an amino modified dimethylpolysiloxane copolymer. Of these, the polyether modified dimethylpolysiloxane copolymer is preferable because it is outstanding in compatibility with the resin composition.

As the examples of the mold release agent used are alkylphosphate, polyoxyalkylene alkylether phosphoric ester, alkylphosphate salt, metallic soap, polymer soap, and the like. The polyoxyalkylene alkyl ether phosphoric ester of the above examples is preferable because it is outstanding in compatibility with the resin composition.

As the examples of the ultraviolet absorber used are: triazine derivative, such as 2-[4{(2-hydroxy-3-dodecyloxypropyl)oxy}-2-hydroxyphenyl]-4,6-bis(2,4-dimethylphenyl)-1,3,5-triazine, and 2-[4{(2-hydroxy-3-tridecyloxypropyl)oxy}-2-hydroxyphenyl]-4,6-bis(2,4-dimethylphenyl)-1,3,5-triazine, and also 2-(2'-xanthenecarboxy-5'-methylphenyl)benzotriazole, 2-(2'-o-nitrobenzyloxy-5'-methylphenyl)benzotriazole, 2-xanthenecarboxy-4-dodecyloxybenzophenone, 2-o-nitrobenzyloxy-4-dodecyloxybenzophenone, and the like.

As the examples of the anti-oxidizing agent used are a hindered phenol anti-oxidant, a hindered amine anti-oxidant, an organosulfur anti-oxidant, a phosphoric ester anti-oxidant, and the like.

The amount of each of the foregoing various additives used preferably ranges from 0.01 to 5 parts by mass with respect to 100 parts by mass of the radiation curable resin composition for lens sheet use according to the present invention including the additives because each additive within this range can exert sufficiently its effect and does not inhibit the ultraviolet curing.

The radiation curable resin composition for lens sheet use according to the present invention is a material suitable for the manufacturing of a lens sheet having a structure in which a molded layer performing a lens function and made of a cured resin material is provided on a plastic substrate. Most of all, when the resin composition is used to manufacture a lens sheet requiring transparency, the ingredients constituting the resin composition are desirably utilized in combination such that the transmittance of light of a wavelength range of 400 nm to 900 nm becomes 80% or more, preferably, 85% or more in the cured material of 200±25 μm thick.

The radiation curable resin composition for lens sheet use according to the present invention is a material suitable for various types of a lens sheet with an optical molded layer which is made of a cured resin material, has fine lens pattern and is provided on a plastic substrate.

FIG. 1 illustrates a sectional view of an example of a Fresnel lens sheet using the radiation curable resin composition for lens sheet use according to the present invention, and a transmission-type screen using the Fresnel lens sheet.

The transmission-type screen 1 shown in FIG. 1 is composed of a Fresnel lens sheet 2 and a lenticular lens sheet 3. The Fresnel lens sheet 2 has a Fresnel-lens-shaped resin layer 4 provided on a plastic substrate 5 by curing the radiation curable resin composition for lens sheet use according to the present invention.

The lens sheet of the present invention has a hardness at which the lens sheet is not deformed when a small pressure is applied to the lens layer and at which the lens sheet is not much stiff and can recover from its deformed shape in the use conditions even if deformation occurs when a large pressure is temporarily applied. Hence, in each of the fine shape units forming a lens, an indentation elasticity modulus around the center of the shape is desirably 700 MPa to 1,600 MPa, particularly preferably, 850 MPa to 1,500 MPa.

Further, the lens sheet of the present invention is not creep-deformed even when pressure is applied to the lens layer for long periods of time and is capable of recovering from its deformed shape after being released from the pressure applied in long time. Accordingly, the percentage of indentation creep around the center of the shape is desirably 15% to 40%, particularly preferably, 20% to 40%.

For the sake of reference, the values of the compressive elasticity modulus and the percentage of indentation creep in the present invention are defined as values obtained from data concerning measurement made in conditions of embodiment examples, described later, by the application of the universal hardness test using a microhardness tester (e.g. H-100 produced by Fischer Instruments K.K).

As the examples of the plastic substrate used for the lens sheet according to the present invention are substrates made of an acrylic resin, a polystyrene resin, a polyester resin and a polycarbonate resin, and the like. Particularly, the substrate made of the acrylic resin consists of methyl methacrylate as the main ingredient and the substrate made of the polyester resin both are suitable for use because they exhibit their favorable adhesion to the radiation curable resin composition for lens sheet use according to the present invention.

Further, the aforementioned transmission-type screen can be provided by using a combination of the Fresnel lens sheet 2 with a lens sheet having another shape, other than with the lenticular lens sheet 3 shown in FIG. 1.

As a method for manufacturing the Fresnel lens 2 by use of the radiation curable resin composition for lens sheet use according to the present invention are exemplified a method of infusing the resin composition into a mother mold for forming a Fresnel lens, then laminating a plastic substrate on the infused resin composition and applying pressure to make close contact between them in such a manner as to prevent the trapping of air, then irradiating the energy ray such as ultraviolet light from the plastic substrate side to cure the resin composition, and then removing the cured resin composition from the mother mold for forming a Fresnel lens, and the like. Further, as a method of manufacturing the lenticular lens sheet 3 are exemplified a method of continuously infusing the radiation curable resin composition for lens sheet use according to the present invention into a roll-shaped mother mold for forming a lenticular lens, then continuously placing a plastic substrate on close contact with the infused resin composition in such a manner as to prevent the trapping of air, then irradiating the energy ray such as ultraviolet light from the plastic substrate side to cure the resin composition, and then removing the cured resin composition from the roll-shaped mother mold for forming a lenticular lens, and the like.

The lens sheet according to the present invention has a lens surface formed by use of the radiation curable resin composition for lens sheet use according to the present invention. In consequence, the lens sheet is outstanding in adhesion to the plastic substrate, shape recovery properties, the mechanical strength, and moldability and exhibits a high refractive index. Hence, for example, when a transmission-type screen is made by use of the Fresnel lens sheet using the radiation curable resin composition for lens sheet use according to the present invention, the screen has the features of improving the resistance properties to recovery from the contact pressure on the lenticular lens and the pressure applied in the assembly process performed after the television unit setting process, and of facilitating design relating to the handling in the screen setting process, that is, workability and assembly. Further, the screen has the feature of a high refractive index enabling the design of a shorter focus lens.

EXAMPLE

Next, the present invention will be described in more detail using embodiment examples and comparison examples. It is needless to say that the present invention is not limited to these examples. Note that "part" and "%" used in the examples all are based on "mass" unless otherwise stated.

Examples 1 to 7 and Comparison Examples 1 to 3

Radiation curable resin compositions for lens sheet use were prepared with the formulation shown in Table 1 and Table 2. The values of glass transition temperature (Tg) of the thermoplastic resin (d) were obtained from the data concerning measurements made by use of a differential scanning calorimeter [thermal analysis system DSC220 produced by Seiko Instruments Corporation] on condition that a rate of temperature rise is 10° C./min. and measurement temperature ranges from −100° C. to 150° C.

TABLE 1

| | | Example | | | | |
|---|---|---|---|---|---|---|
| | Item | 1 | 2 | 3 | 4 | 5 |
| (a) | a-1 (part) | 38 | 35 | 35 | 35 | 38 |
| | a-2 (part) | — | — | — | — | — |
| (b1) | b1-1 (part) | 10 | 10 | 15 | 16 | 8 |
| (b2) | b2-1 (part) | 15 | 15 | 10 | 8 | 13 |
| (b3) | b3-1 (part) | 12 | 10 | 15 | 10 | 10 |
| (c) | c-1 (part) | 22 | 26 | 10 | 17 | 17 |
| | c-2 (part) | — | — | 12 | — | — |
| | c-3 (part) | — | — | — | 7 | 7 |
| (d) | d-1 (part) | 3 | 7 | 3 | 3 | 2 |
| | d-2 (part) | — | — | — | — | 1 |
| (e) | e-1 (part) | — | — | — | 4 | 4 |
| | e-2 (part) | — | — | — | — | — |
| | Photo-initiator (part) | 3 | 3 | 3 | 3 | 3 |

TABLE 2

| | | Example | | Comparison example | | |
|---|---|---|---|---|---|---|
| | Item | 6 | 7 | 1 | 2 | 3 |
| (a) | a-1 (part) | 33 | — | — | 38 | 38 |
| | a-2 (part) | — | 35 | 35 | — | — |
| (b1) | b1-1 (part) | 15 | 8 | 10 | 25 | 25 |
| (b2) | b2-1 (part) | 9 | 8 | 10 | — | — |
| (b3) | b3-1 (part) | 11 | 20 | — | 12 | 12 |
| (c) | c-1 (part) | 16 | 23 | 45 | 22 | 20 |
| | c-2 (part) | — | — | — | — | — |
| | c-3 (part) | 9 | — | — | — | — |
| (d) | d-1 (part) | 2 | 4 | — | 3 | 3 |
| | d-2 (part) | 1 | — | — | — | 2 |
| (e) | e-1 (part) | 4 | — | — | — | — |
| | e-2 (part) | — | 2 | — | — | — |
| | Photo-initiator (part) | 3 | 3 | 3 | 3 | 3 |

(Evaluation Sample Manufacturing)

A cured resin film for measurement use and a Fresnel lens sheet and base plate with a cured resin layer were manufactured by the following method.

(1) Manufacturing of cured resin film: a radiation curable resin composition for lens sheet use was heated to 40° C., then was supplied between a chrome-plated metal plate and a transparent PET film before surface treatment, which then was adjusted in thickness. Then, by use of a high-pressure mercury lamp, ultraviolet light of 1000 jm/cm$^2$ was irradiated from the transparent substrate side to cure the resin composition. Then, the radiation curable resin composition layer is removed from the metal plate and the transparent substrate. Thus, the cured resin film having a smooth surface and a thickness of 200±25 μm was manufactured.

(2) Manufacturing of substrate with a cured resin layer: a radiation curable resin composition for lens sheet use was heated to 40° C., then was supplied between a chrome-plated metal plate and a 10 cm-long, 10 cm-wide, 2 mm-thick substrate made of a polymethyl methacrylate resin, which then was adjusted in thickness. Then, a high-pressure mercury lamp was used to irradiate ultraviolet light of 1000 jm/cm$^2$ from the transparent substrate side to cure the resin composition. Then, the transparent substrate, together with the radiation curable resin composition layer, is removed from the metal plate. Thus, the substrate with the 150±25 μm thick cured resin film having a smooth surface being formed on the transparent substrate was manufactured.

(3) Manufacturing of a Fresnel lens sheet: a radiation curable resin composition for lens sheet use heated to 42° C. was charged into the metal mold for forming a Fresnel lens. Then, while the temperature of the charged resin composite was being retained at 42° C., a 2 mm thick substrate made of a polymethyl methacrylate resin was laminated on the resin composite and then pressure is applied to them in such a manner as to prevent the trapping of air. Then, ultraviolet light was applied to the resin composition on condition that the dose is 200 mj/cm$^2$, and a peak illuminance is 250 mW/cm$^2$, by use of a metal-halide-type ultraviolet lamp (produced by Nippon Denchi Corporation).

(Evaluation Method)

In accordance with the following measurement, test methods, evaluations of viscosity, refractive index, casting efficiency, shape reproducibility, adhesion, mold fracture and chipping, shape recovery properties and shape retention properties are performed on the obtained radiation curable resin composition for lens sheet use, the obtained cured resin film, and the obtained Fresnel lens sheet and base plate with the cured resin layer. The evaluation results are shown in Table 3 and Table 4.

TABLE 3

| | Example | | | | |
|---|---|---|---|---|---|
| Item | 1 | 2 | 3 | 4 | 5 |
| Viscosity (mPa · s) | 13300 | 19700 | 6920 | 9200 | 10630 |
| Liquid Refractive index | 1.537 | 1.532 | 1.530 | 1.530 | 1.530 |
| Cured material refractive index | 1.560 | 1.555 | 1.552 | 1.554 | 1.553 |

TABLE 3-continued

| | Example | | | | |
|---|---|---|---|---|---|
| Item | 1 | 2 | 3 | 4 | 5 |
| T(max) (° C.) | 45 | 40 | 42 | 45 | 44 |
| Casting efficiency | ⊚ | ⊚ | ⊚ | ⊚ | ⊚ |
| Shape reproducibility | ⊚ | ⊚ | ⊚ | ⊚ | ⊚ |
| Adhesion | ⊚ | ⊚ | ⊚ | ⊚ | ⊚ |
| Mold fracture and chipping | ⊚ | ⊚ | ⊚ | ⊚ | ⊚ |
| Shape recovery properties | ⊚ | ⊚ | ⊚ | ⊚ | ⊚ |
| Shape retention properties | ○ | ○ | ○ | ⊚ | ⊚ |
| Indentation elasticity modulus (MPa) | 1480 | 920 | 1130 | 1360 | 1200 |
| Percentage of indentation creep (%) | 28 | 35 | 30 | 23 | 29 |

TABLE 4

| | Example | | Comparison example | | |
|---|---|---|---|---|---|
| Item | 6 | 7 | 1 | 2 | 3 |
| Viscosity (mPa·s) | 9320 | 6540 | 2500 | 14300 | 32300 |
| Liquid Refractive index | 1.530 | 1.530 | 1.543 | 1.535 | 1.533 |
| Cured material refractive index | 1.554 | 1.553 | 1.567 | 1.555 | 1.552 |
| T(max) (° C.) | 46 | 45 | 33 | 53 | 54 |
| Casting efficiency | ⊚ | ⊚ | ⊚ | ⊚ | ⊚ |
| Shape reproducibility | ⊚ | ⊚ | ⊚ | ⊚ | ⊚ |
| Adhesion | ⊚ | ○ | ○ | ⊚ | ⊚ |
| Mold fracture and chipping | ⊚ | ⊚ | ⊚ | ⊚ | ⊚ |
| Shape recovery properties | ⊚ | ⊚ | ⊚ | Δ | Δ |
| Shape retention properties | ⊚ | ⊚ | X | Δ | Δ |
| Indentation elasticity modulus (MPa) | 1390 | 1250 | 620 | 1830 | 1950 |
| Percentage of indentation creep (%) | 26 | 25 | 43 | 9 | 5 |

(1) Viscosity: viscosity measurement (mPa·s) was performed on the radiation curable resin compositions for lens sheet use prepared with the formulations in Tables 1 and 2, at 25° C. by an E-type rotational viscometer.

(2) Refractive index: measurement was performed on liquid-form samples and cured samples. The refractive index of the liquid-form samples was measured at 25° C. after a coating of the radiation curable resin compositions for lens sheet use, which is used as the sample, was directly applied to a prism of an Abbe refractometer. Further, the refractive index of the cured samples was measured at 25° C. of the sample temperature by use of the cured resin film as the sample, use of 1-bromonaphthalene as intermediate liquid for making the sample adhere to the prism, and use of Abbe refractometer.

(3) T(max): this is a temperature representing the maximum value of the mechanical loss tangent of the radiation curable resin compositions for lens sheet use. The cured resin film was used as the sample and measured by use of a dynamic viscoelasticity measuring apparatus RSA-2 (produced by Rheometrics Corporation) employing a tensile-strain-controlled method on condition that a size is 6 mm×35 mm, a frequency is 1 Hz, a load strain is 0.05%, a rate of temperature rise is 3° C./min., and a measurement temperature is −50° C. to 150° C. Then, data concerning the measurement within the temperature range from −30° C. to 120° C. out of the data concerning the above measurement was used to obtain the temperature T(max).

(4) Casting efficiency: the degree of difficulty in performing the process of supplying the radiation curable resin composition for lens sheet use into between the metal mold for forming a Fresnel lens and the acrylate resin plate in the manufacturing process for the Fresnel lens sheet is determined. Good casting efficiency is represented by ⊚ and failed casting efficiency is represented by x.

(5) Shape reproducibility: in the manufacturing process for the Fresnel lens sheet, a visual inspection was made on the appearance of the Fresnel lens sheet which had been removed from the metal mold for forming a Fresnel lens. The Fresnel lens sheet with the uniform surface shape without chipping is represented by ⊚ and the Fresnel lens sheet having the chipped shape because of occurrence of bubbles in the resin, the state of no resin reaching the intricate details of the mold is represented by x.

(6) Adhesion: the base plate with the cured resin layer was used to measure the adhesion between the base plate and the resin layer in conformity with JISK5600-5-6. The case when the grid pattern completely remained is represented by ⊚. The case when the grid pattern remained at a ratio of (95 to 99)/100 is represented by ○. The case when the grid pattern remained at a ratio of (80 to 94)/100 is represented by Δ. The case when the grid pattern remained below this ratio is represented by x.

(7) Mold fracture and chipping: a precision handcutter KPS3002 (produced by Sankyou Corporation) was used to cut the base plate with the cured resin layer from the cured resin layer side. In this cutting process, the case of no damage to the cured resin layer or the base plate is represented by ⊚, and the case of occurrence of fracture and chipping is represented by x.

(8) Shape recovery properties: the base plate with the cured resin layer was used. By the application of the universal hardness test using a microhardness tester (H-100 produced by Fischer Instruments K.K), the shape recovery properties were evaluated, according to the following steps (i) to (v). As the indenting too, the ball indentor having a radius R of 0.2 mmø made of tungsten carbite was used.

(i) At 40° C., the load is increased to an indentation load in which the indentation depth (=the mount of deformation) reaches 15 μm to 20 μm for 10 seconds.

(ii) The above indentation force is retained for 60 seconds.

(iii) The force is decreased to 0.4 mN (=minimum load of the tester) for four seconds.

(iv) The force 0.4 mN is retained for 60 seconds to cause a decrease in the indentation depth.

(v) The above steps (i) to (iv) are repeated three times, and then the mean value of the recoveries is obtained.

The case of less than 3 μm of an average indentation depth after recovery is represented by ⊚. The case of less than 3 μm and 5 μm or more is represented by ○. The case of 5 μm or more and less than 8 μm is represented by Δ. The case of 8 μm or more is represented by x.

(9) Shape retention properties: a 10 cm×10 cm test specimen, which had been cut out from a corner of the Fresnel lens sheet, was horizontally placed on the smooth metal plate with the cured resin layer side up. A weight having the flat bottom was placed on a central portion of the test specimen. The load of 20 g/cm² was applied at 40° C. for 7 days. Then, after the temperature of the test specimen was decreased back to 25° C., the load was removed. Visual inspections are conducted for the presence of deformation marks on the Fresnel lens sheet after a lapse of 30 minutes and 24 hours from the load release. The case when any deformation mark was not found after a lapse of 30 minutes is represented by ⊚. The case when the deformation mark was slightly found after 30 minutes but was not fount after the 24 hours is represented by ○. The case when the deformation mark was slightly found after 24 hours is represented by Δ. The case when the deformation mark was clearly found after 24 hours is represented by x.

Figure 2:
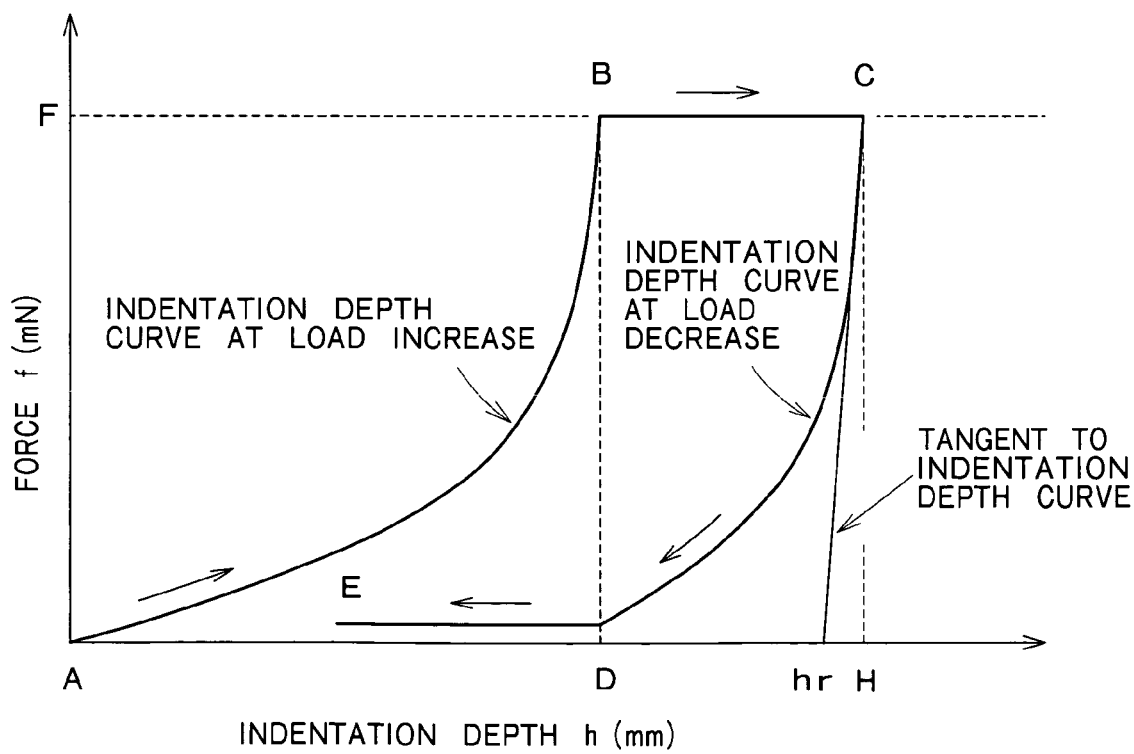
FIG. 2 is a diagram illustrating an example of a load-dependence curve obtained by measuring an indentation elasticity modulus when a Fresnel lens sheet is used.

(10) Indentation elasticity modulus: the Fresnel lens sheet was used. By the application of the universal hardness test using a microhardness tester (H-100 produced by Fischer Instruments K.K), the indentation elasticity modulus were measured, according to the following steps (i) to (v). A load-dependence curve obtained in the measurement is shown in FIG. 2. Deformation occurs when the load is gradually increased from load=zero (point A) up to a set force, and the indentation depth of the indentor increases (point B). After the load has been increased to the set force, if the force is retained without change for a predetermined period of time, the indentation depth is continuously increased during the period due to creep deformation (point C). Then, when the load is gradually decreased up to a minimum force, the lens sheet recovers from the deformation and the indentation depth of the indentor decreases (point D). If the minimum force is retained without change for a predetermined period of time, the lens sheet further recovers from the deformation during the period (point E).

(i) At 23° C., the indentation force is increased from zero to 20 mN for 10 seconds.

(ii) The above indentation force is retained for 60 seconds to cause occurrence of indentation creep.

(iii) The force is decreased to 0.4 mN (=minimum load of the tester) for four seconds.

(iv) The force 0.4 mN is retained for 60 seconds to cause a decrease in the indentation depth.

(v) The above steps (i) to (iv) are repeated three times. A load-dependence curve of the indentation depth is obtained in each cycle, then a indentation elasticity modulus (unit: MPs) is obtained from each curve and then the mean value of the indentation elasticity modulus is calculated.

Figure 3:
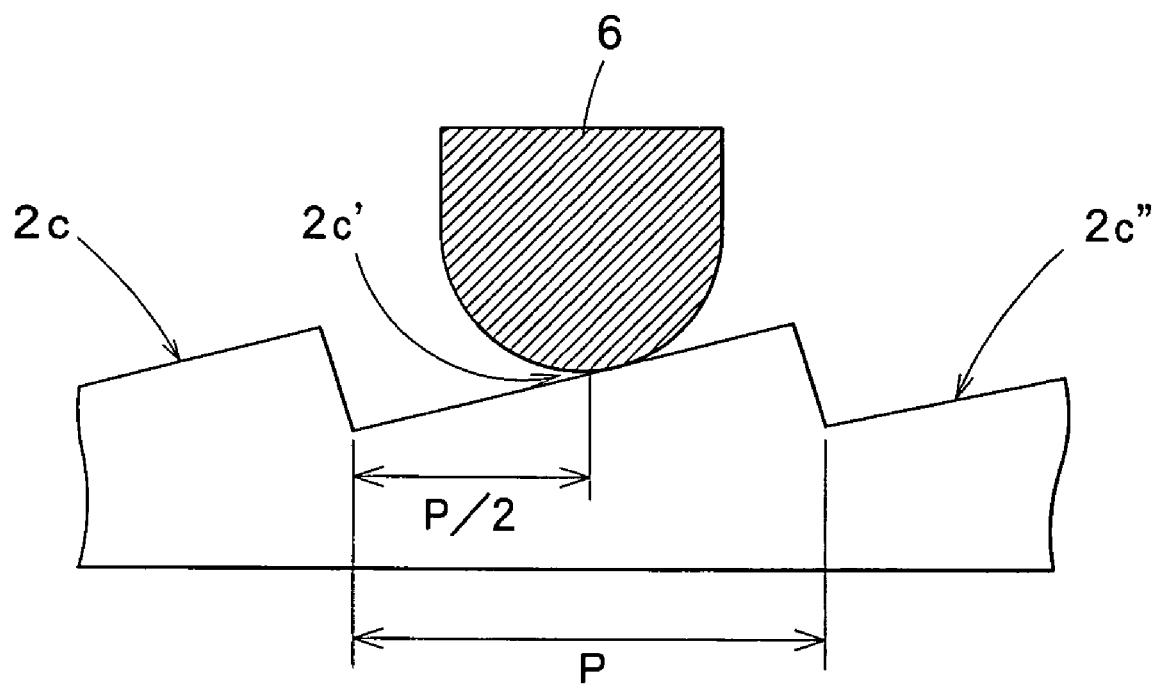
FIG. 3 is a diagram illustrating part of the Fresnel lens sheet acted upon by a ball indentor when the indentation elasticity modulus is measured.

Note that as the indenting too, the ball indentor having a radius R of 0.2 mmø made of tungsten carbite was used. As illustrated in FIG. 3, portions of the lens sheet measured by the ball indentor are preferably around a center portion of each of lens surfaces constituting the Fresnel lens as indicated with 2c, 2c' and 2c" in FIG. 3. Assuming that the interval between the adjacent concave portions on the lens surfaces is a pitch P, the preferable portion is around a position corresponding to P/2.

The indentation elasticity modulus (E) is calculated from the following equation.

$$E=1/\{2\times[\text{hr}(2R-\text{hr})]^{1/2}\times H\times(\Delta H/\Delta f)-(1-v_{WC})/E_{WC}\}$$

Where, hr: the indentation depth at a point of intersection of the tangent line to the indentation depth curve when the load is decreased and the axis of the indentation depth (transverse axis) (unit: mm), R: the radius of the ball indentor (R=0.2 mm), H: a maximum value of the identation depth h (unit:mm), $\Delta H/\Delta f$: a reciprocal of the slope of the tangent line to the indentation depth curve when the load is decreased, $v_{WC}$: a Poisson's ratio of tungsten carbite ($v_{WC}$=0.22), and $E_{WC}$: a coefficient of elasticity of tungsten carbite ($E_{WC}$=5.3×$10^5$ N/mm²).

(11) Percentage of indentation creep: the Fresnel lens sheet was used. By the application of the universal hardness test using a microhardness tester (H-100 produced by Fischer Instruments K.K), the percentage of indentation creep was measured through the same steps as those for the measurement of the indentation elasticity modulus.

The percentage of indentation creep (C) is calculated from the following equation.

$$C=[(h2-h1)/h1]\times 100$$

Where, h1: the identation depth when the load reaches a set test load (=20 mN), and h2: the indentation depth when the load is retained for a predetermined time (60 seconds) (point C in FIG. 2).

INDUSTRIAL APPLICABILITY

It is possible to widely use the present invention to manufacture a lens sheet having a structure in which a molded layer having a lens function and made of a resin cured material is provided on a plastic substrate, such as a Fresnel lens sheet and a lenticular lens sheet.

The invention claimed is:
1. A radiation curable resin composition for a lens sheet, characterized by comprising:
   an epoxy (meth)acrylate (a);
   a bifunctional (meth)acrylate (b1) expressed by the general formula (1) described below,

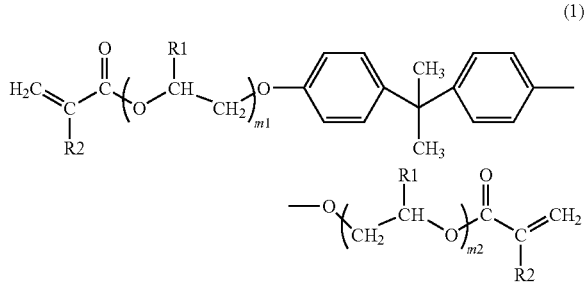

(wherein, R1, R2 denote either hydrogen atoms or a methyl group, and a mean value of m1+m2 is 1 to 5);
a bifunctional (meth)acrylate (b2) expressed by the general formula (2) described below,

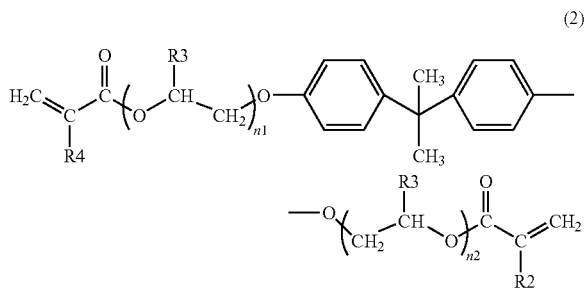

(wherein, R3, R4 denote either hydrogen atoms or a methyl group, and a mean value of n1+n2 is 8 to 20);
a bifunctional (meth)acrylate (b3) obtained from (meth) acrylic acid and an aliphatic dihydric alcohol having an oxyalkylene structure;
a monofunctional (meth)acrylate (c); and
a thermoplastic resin (d).

2. The radiation curable resin composition for the lens sheet according to claim 1, wherein a mass ratio (b1)/(b2) of the bifunctional (meth)acrylate (b1) and the bifunctional (meth)acrylate (b2) ranges from 20/80 to 80/20, and a mass ratio of (b3)/[(b1)+(b2)] of the bifunctional (meth)acrylate (b3) to the sum of the bifunctional (meth)acrylate (b1) and the bifunctional (meth)acrylate (b2) ranges from 15/85 to 70/30.

3. The radiation curable resin composition for the lens sheet according to claim 2, wherein the bifunctional (meth) acrylate (b3) is a bifunctional (meth)acrylate (b31) obtained from (meth)acrylic acid and an aliphatic dihydric alcohol having an oxypropylene structure.

4. The radiation curable resin composition for the lens sheet according to claim 3, wherein the thermoplastic resins (d) is a polyurethane-type resin having a glass transition temperature ranging from −70° C. to 0° C.

5. The radiation curable resin composition for the lens sheet according to claim 4, wherein the epoxy (meth)acrylate (a) is a (meth)acrylate of a bisphenol-type epoxy resin, and the monofunctional (meth)acrylate (c) is a monofunctional (meth)acrylate (c1) having a cyclic structure.

6. The radiation curable resin composition for the lens sheet according to claim 1, wherein in 100 parts by mass of the sum of the epoxy (meth)acrylate (a), the bifunctional (meth)acrylate (b1), the bifunctional (meth)acrylate (b2), the bifunctional (meth)acrylate (b3), the monofunctional (meth) acrylate (c), and thermoplastic resin (d), the content of the epoxy (meth)acrylate (a) ranges from 20 to 70 parts by mass, the content of the sum of the bifunctional (meth)acrylates (b1), (b2) and (b3) ranges from 5 to 60 parts by mass, the content of the monofunctional (meth)acrylate (c) ranges from 5 to 40 parts by mass, and the content of the thermoplastic resin (d) ranges from 0.5 to 10 parts by mass.

7. The radiation curable resin composition for the lens sheet according to claim 1, further comprising a multifunctional(meth)acrylate (e) as trifunctional or more than trifunctional.

8. The radiation curable resin composition for the lens sheet according to claim 7, wherein the multifunctional (meth)acrylate (e) as trifunctional or more than trifunctional is a (meth)acrylate (e1) of aliphatic polyhydric alcohol having an oxypropylene structure.

9. The radiation curable resin composition for the lens sheet according to claim 7, wherein in 100 parts by mass of the sum of the epoxy (meth)acrylate (a), the bifunctional (meth)acrylate (b1), the bifunctional (meth)acrylate (b2), the bifunctional (meth)acrylate (b3), the monofunctional (meth) acrylate (c), thermoplastic resin (d) and the multifunctional (meth)acrylate (e) as trifunctional or more than trifunctional, the content of the epoxy (meth)acrylate (a) ranges from 20 to 70 parts by mass, the content of the sum of the bifunctional (meth)acrylates (b1), (b2) and (b3) ranges from 5 to 60 parts by mass, the content of the monofunctional (meth)acrylate (c) ranges from 5 to 40 parts by mass, the content of the thermoplastic resin (d) ranges from 0.5 to 10 parts by mass, and the content of the multifunctional (meth)acrylate (e) as trifunctional or more than trifunctional ranges from 1 to 10 parts by mass.

10. A lens sheet, characterized in that a lens-shaped resin layer formed by curing the radiation curable resin composition for the lens sheet according to claim 1 is provided on a plastic substrate.

11. The lens sheet according to claim 10, wherein the lens sheet is a Fresnel lens sheet.

* * * * *

UNITED STATES PATENT AND TRADEMARK OFFICE
CERTIFICATE OF CORRECTION

PATENT NO. : 7,666,920 B2
APPLICATION NO. : 10/565574
DATED : February 23, 2010
INVENTOR(S) : Tokuda et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 957 days.

Signed and Sealed this

Twenty-eighth Day of December, 2010

David J. Kappos
*Director of the United States Patent and Trademark Office*